(12) United States Patent
Fischer

(10) Patent No.: US 8,112,102 B2
(45) Date of Patent: Feb. 7, 2012

(54) METHOD FOR READING DYNAMIC SYSTEM INFORMATION BLOCKS

(75) Inventor: Patrick Fischer, Bourg la Reine (FR)

(73) Assignee: LG Electronics Inc., Seoul (KR)

( * ) Notice: Subject to any disclaimer, the term of this patent is extended or adjusted under 35 U.S.C. 154(b) by 675 days.

(21) Appl. No.: 12/158,273

(22) PCT Filed: Dec. 19, 2006

(86) PCT No.: PCT/KR2006/005564
§ 371 (c)(1),
(2), (4) Date: Jun. 19, 2008

(87) PCT Pub. No.: WO2007/073079
PCT Pub. Date: Jun. 28, 2007

(65) Prior Publication Data
US 2009/0253422 A1 Oct. 8, 2009

Related U.S. Application Data

(60) Provisional application No. 60/751,840, filed on Dec. 19, 2005.

(51) Int. Cl.
*H04W 68/00* (2009.01)

(52) U.S. Cl. ........ 455/458; 455/436; 455/442; 455/466; 370/331; 370/328; 370/338

(58) Field of Classification Search ................. 455/458, 455/436, 442, 466; 370/331, 328, 338
See application file for complete search history.

(56) References Cited

U.S. PATENT DOCUMENTS

| 7,689,196 | B2 * | 3/2010 | Hutchinson et al. ....... 455/343.1 |
| 2004/0097239 | A1 | 5/2004 | Kim |
| 2004/0229605 | A1 * | 11/2004 | Hwang et al. .............. 455/426.1 |
| 2005/0181801 | A1 | 8/2005 | Funnell |

FOREIGN PATENT DOCUMENTS

| CN | 1462122 | 12/2003 |
| CN | 1505416 | 6/2004 |

* cited by examiner

*Primary Examiner* — Nghi Ly
(74) *Attorney, Agent, or Firm* — Lee, Hong, Degerman, Kang & Waimey

(57) ABSTRACT

In a wireless mobile communications system, a method of controlling or updating system information included in system information blocks (SIBs). The mobile communication system allows the network (i.e., RNC) to trigger the terminal (i.e., UE) to apply new timer values and information values independently of whether the UE has read the timer and/or values of the SIBs based on a previous timer values.

18 Claims, 4 Drawing Sheets

[Fig. 1]
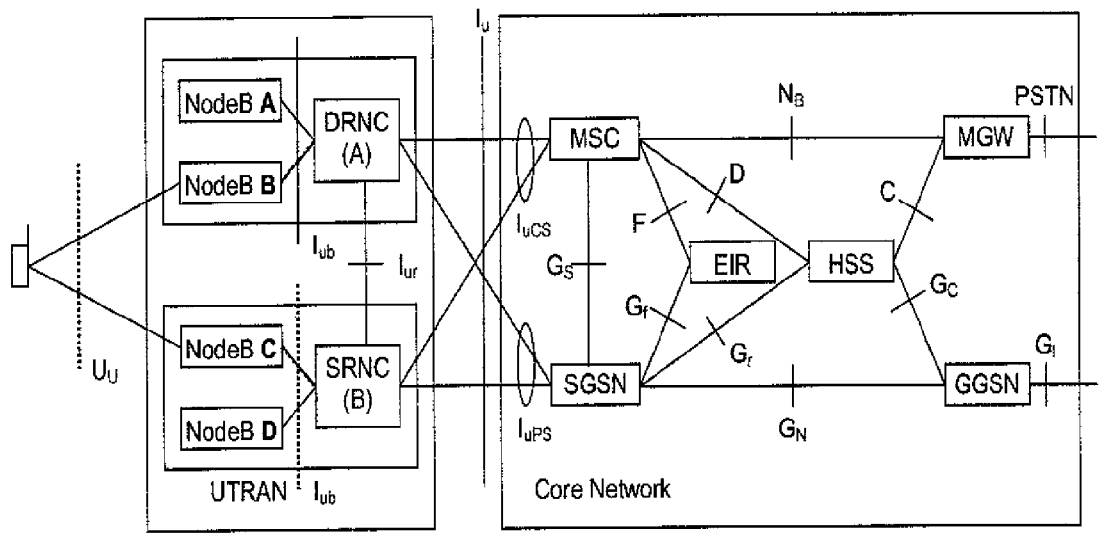
[Fig. 2]
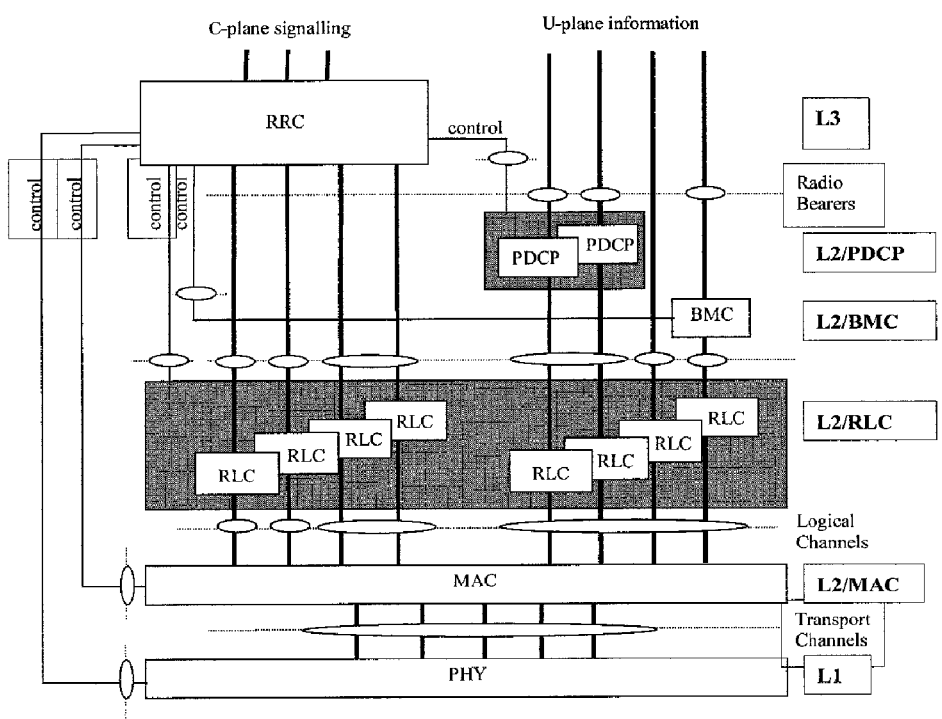

[Fig. 3]
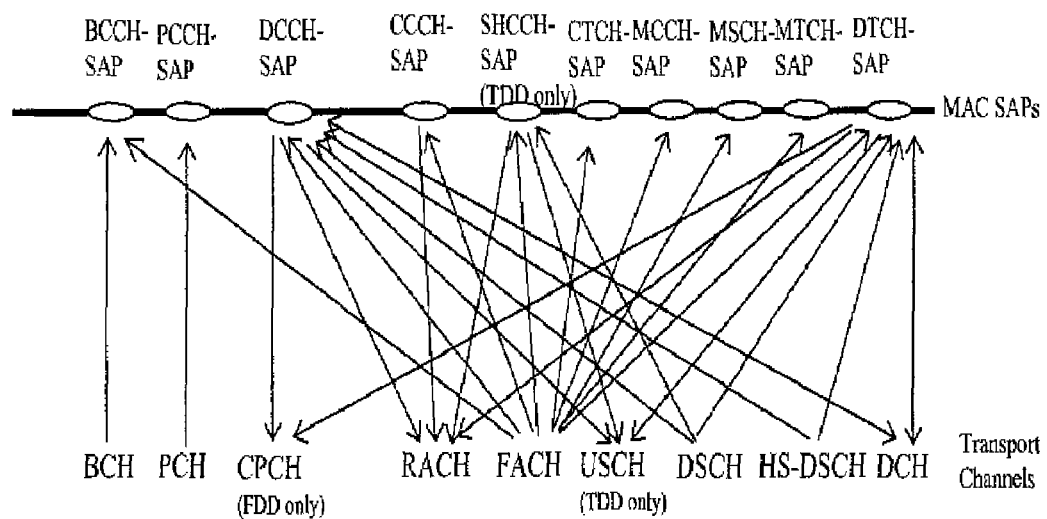
[Fig. 4]
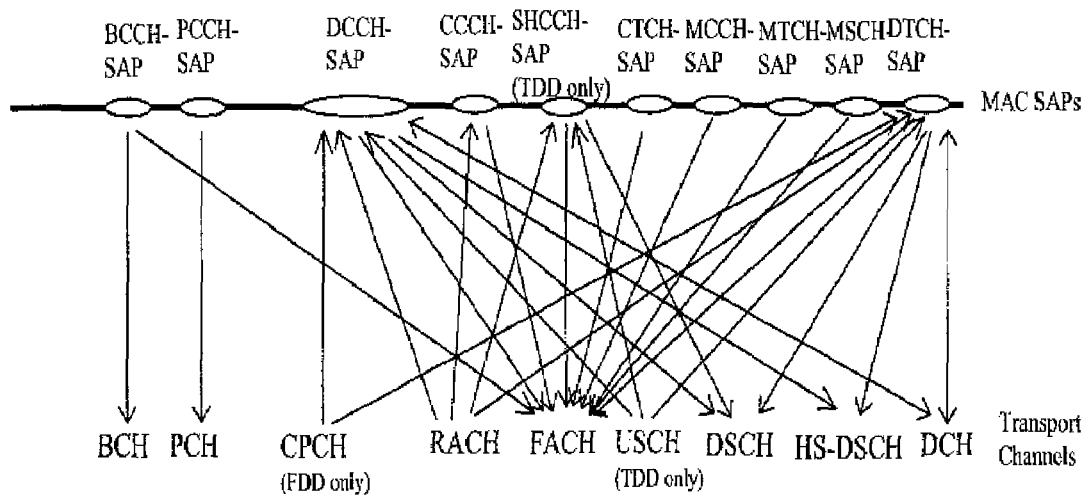

[Fig. 5]
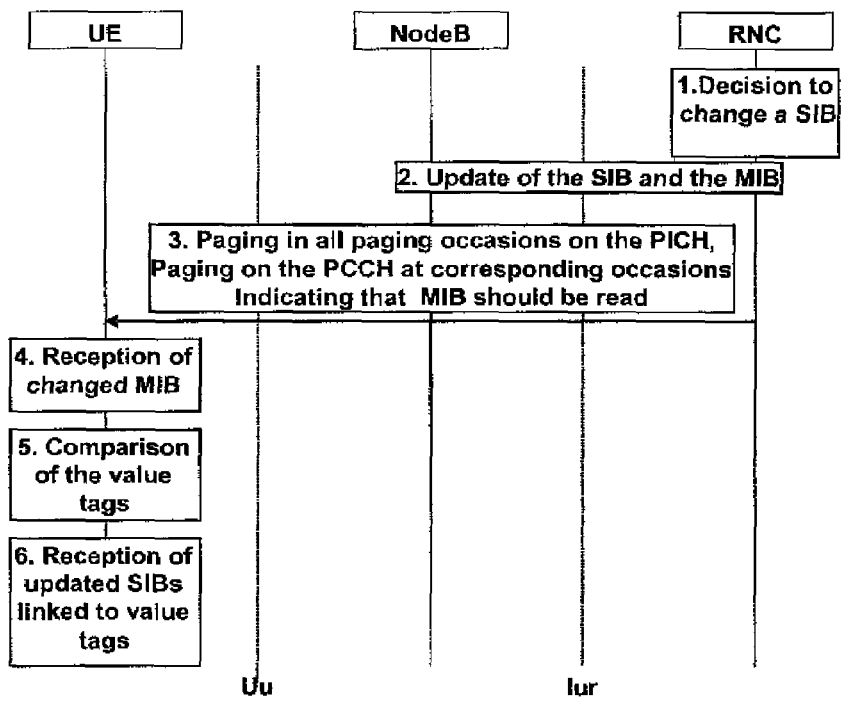
[Fig. 6]
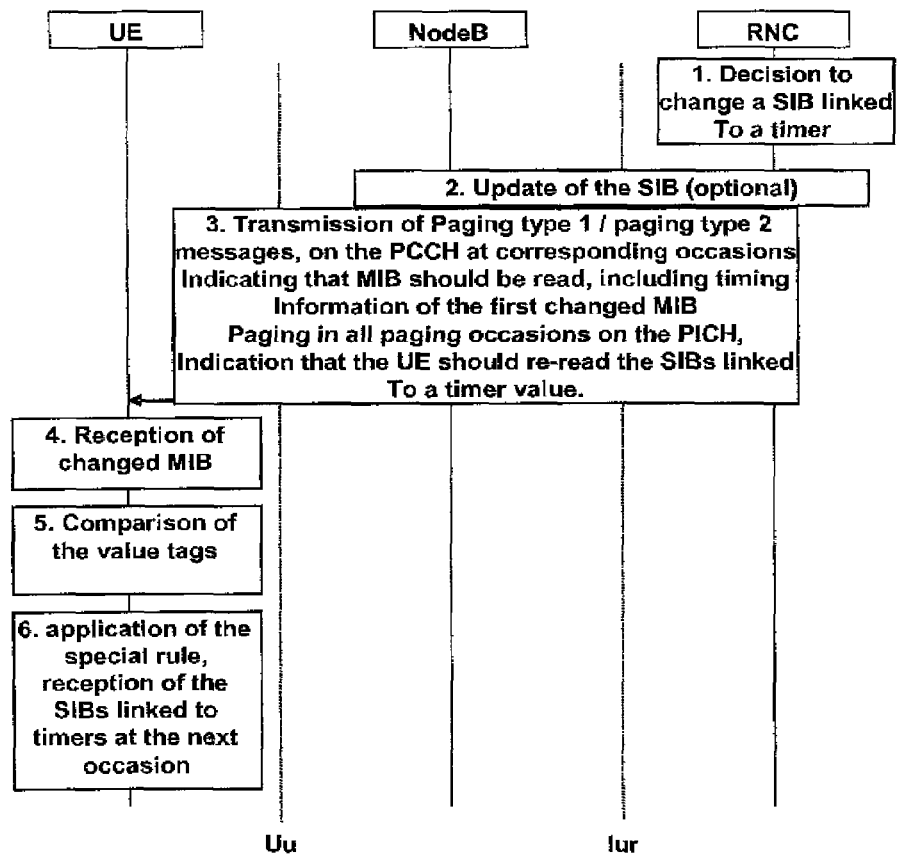

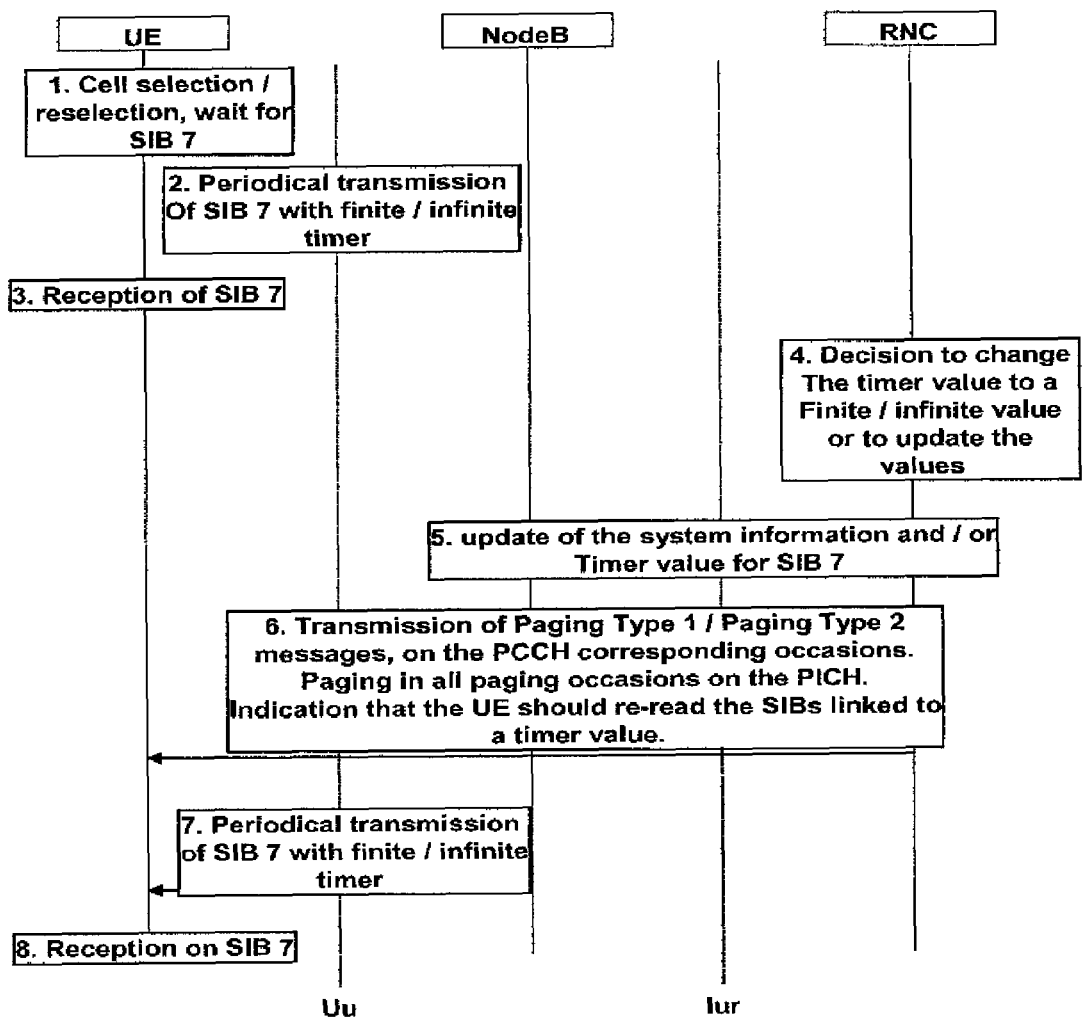

METHOD FOR READING DYNAMIC SYSTEM INFORMATION BLOCKS

CROSS-REFERENCE TO RELATED APPLICATIONS

This application is a national stage application of International Application No. PCT/KR2006/005564, filed on Dec. 19, 2006, which claims the benefit of earlier filing date and right of priority to U.S. provisional application No. 60/751,840, filed on Dec. 19, 2005, the contents of which are hereby incorporated by reference herein in its entirety.

TECHNICAL FIELD

The present invention relates to a method for reading system information blocks (SIBs). In particular, the present invention is to allow a radio network controller (RNC) to trigger an user equipment (UE) for applying new timer values and information values independently of which the UE has read the timer values and/or values of the SIBs based on former timer values.

BACKGROUND ART

The universal mobile telecommunications system (UMTS) is a third-generation mobile communications system evolving from the global system for mobile communications system (GSM), which is the European standard. The UMTS is aimed at providing enhanced mobile communications services based on the GSM core network and wideband code-division multiple-access (W-CDMA) technologies.

FIG. 1 gives an overview of the UMTS network, including the UE, the UTRAN and the core network (CN). The UTRAN is composed of several radio network controllers (RNCs) and Node-Bs, which communicate via the Iub interface.

Each RNC controls several Node-Bs. Each RNC is connected via the IU interface to the core network (CN), specifically to the MSC (Mobile-services Switching Center) and the SGSN (Serving GPRS Support Node) of the CN. RNCs can be connected to other RNCs via the Iur interface. The RNC handles the assignment and management of radio resources and operates as an access point with respect to the core network.

The Node-Bs receive information sent by the physical layer of the terminal through an uplink transmission and transmit data to the terminal through a downlink transmission. The Node-Bs operate as access points of the UTRAN for the terminal.

The SGSN is connected via the $G_f$ interface to the EIR (Equipment Identity Register), via the $G_S$ interface to the MSC, via the $G_N$ interface to the GGSN (Gateway GPRS Support Node) and via the $G_R$ interface to the HSS (Home Subscriber Server). The EIR maintains lists of mobiles that are allowed to be used on the network.

The MSC controls the connection for circuit switch (CS) services. The MSC is connected to the MGW (Media Gateway) via the $N_B$ interface, to the EIR via the F interface, and to the HSS via the D interface. The MGW is connected to the HSS via the C interface and to the PSTN (Public Switched Telephone Network). The MGW facilitates the adapting of the codecs between the PSTN and the connected RAN.

The GGSN is connected to the HSS via the $G_C$ interface and to the Internet via the $G_I$ interface. The GGSN is responsible for routing, charging and separation of data flows into different radio access bearers (RABs). The HSS handles the subscription data of the users.

The UTRAN establishes and maintains a radio access bearer (an RAB) for communication between the terminal and the core network. The core network requests end-to-end quality of service (QoS) requirements from the RAB and the RAB supports the QoS requirements set by the core network. Accordingly, the UTRAN can satisfy the end-to-end QoS requirements by constructing and maintaining the RAB.

The services provided to a specific terminal are roughly divided into circuit switched (CS) services and packet switched (PS) services. For example, a general voice conversation service is a circuit switched service, while a Web browsing service via an Internet connection is classified as a packet switched (PS) service.

For supporting circuit switched services, the RNCs are connected to the mobile switching center (MSC) of the core network and the MSC is connected to the gateway mobile switching center (GMSC) that manages the connection with other networks. For supporting packet switched services, the RNCs are connected to the serving general packet radio service (GPRS) support node (SGSN) and the gateway GPRS support node (GGSN) of the core network. The SGSN supports the packet communications with the RNCs and the GGSN manages the connection with other packet switched networks, such as the Internet.

FIG. 2 illustrates an architecture of a radio interface protocol between the terminal and the UTRAN according to the 3GPP radio access network standards. As shown in FIG. 2, the radio interface protocol has vertical layers comprising a physical layer, a data link layer, and a network layer, and has horizontal planes comprising a user plane (U-plane) for transmitting user data and a control plane (C-plane) for transmitting control information.

The user plane handles traffic information with the user, such as voice or Internet protocol (IP) packets. The control plane handles control information for an interface with a network, maintenance and management of a call, and the like. The protocol layers in FIG. 2 can be divided into a first layer (L1), a second layer (L2), and a third layer (L3) based on the three lower layers of an open system interconnection (OSI) standard model. The first layer (L1), or the physical layer, provides an information transfer service to an upper layer by using various radio transmission techniques. The physical layer is connected to an upper layer, called a medium access control (MAC) layer, via a transport channel.

The MAC layer and the physical layer exchange data via the transport channel. The second layer (L2) includes a MAC layer, a radio link control (RLC) layer, a broadcast/multicast control (BMC) layer and a packet data convergence protocol (PDCP) layer.

The MAC layer handles mapping between logical channels and transport channels and provides allocation of the MAC parameters for allocation and re-allocation of radio resources. The MAC layer is connected to an upper layer, called the radio link control (RLC) layer, via a logical channel.

Various logical channels are provided according to the type of information transmitted. In general, a control channel is used to transmit information of the control plane and a traffic channel is used to transmit information of the user plane.

A logical channel may be a common channel or a dedicated channel depending on whether the logical channel is shared. Logical channels include a dedicated traffic channel (DTCH), a dedicated control channel (DCCH), a common traffic channel (CTCH), a common control channel (CCCH), a broadcast control channel (BCCH) and a paging control channel (PCCH) or a Shared Channel Control Channel.

The BCCH provides information including information utilized by a terminal to access a system. The PCCH is used by the UTRAN to access a terminal.

The possible mapping between the logical channels and the transport channels from a UE perspective is given in FIG. 3. The possible mapping between the logical channels and the transport channels from a UTRAN perspective is given in FIG. 4.

The MAC-d sub-layer manages a dedicated channel (DCH), which is a dedicated transport channel for a specific terminal. The MAC-d sub-layer is located in a serving RNC (SRNC) that manages a corresponding terminal. One MAC-d sub-layer also exists in each terminal.

The RLC layer, depending of the RLC mode of operation, supports reliable data transmissions and performs segmentation and concatenation on a plurality of RLC service data units (SDUs) delivered from an upper layer. When the RLC layer receives the RLC SDUs from the upper layer, the RLC layer adjusts the size of each RLC SDU in an appropriate manner based upon processing capacity and then creates data units by adding header information thereto. The data units, called protocol data units (PDUs), are transferred to the MAC layer via a logical channel. The RLC layer includes a RLC buffer for storing the RLC SDUs and/or the RLC PDUs.

The BMC layer schedules a cell broadcast (CB) message transferred from the core network and broadcasts the CB message to terminals positioned in a specific cell or cells.

The PDCP layer is located above the RLC layer. The PDCP layer is used to transmit network protocol data, such as the IPv4 or IPv6, effectively on a radio interface with a relatively small bandwidth. For this purpose, the PDCP layer reduces unnecessary control information used in a wired network, by using a function called header compression.

The radio resource control (RRC) layer located at the lowest portion of the third layer (L3) is only defined in the control plane. The RRC layer controls the transport channels and the physical channels in relation to setup, reconfiguration, and the release or cancellation of the radio bearers (RBs). Additionally the RRC handles user mobility within the RAN and additional services, such as location services.

The RB signifies a service provided by the second layer (L2) for data transmission between the terminal and the UTRAN. In general, the set up of the RB refers to the process of stipulating the characteristics of a protocol layer and a channel required for providing a specific data service, and setting the respective detailed parameters and operation methods.

The different possibilities that exist for the mapping between the radio bearers and the transport channels for a given UE are not all possible all the time. The UE and UTRAN deduce the possible mapping depending on the UE state and the procedure that the UE and UTRAN are executing. The different states and modes are explained in more detail below, as far as they concern the present invention.

The different transport channels are mapped onto different physical channels. For example, the RACH transport channel is mapped on a given PRACH, the DCH can be mapped on the DPCH, the FACH and the PCH can be mapped on the S-CCPCH, and the DSCH is mapped on the PDSCH. The configuration of the physical channels is given by RRC signaling exchanged between the RNC and the UE.

In UMTS, as described above, system information is usually broadcasted in system information blocks (SIBs) on a specific channel, and system information is separately sent in different SIBs in order to optimize the reading of the system information. When the different SIBs are transmitted, the transmitted SIBs are indicated in a master information block (MIB) or scheduling blocks. The MIB indicates a position of the scheduling blocks and value tags of the SIBs, and the scheduling blocks indicate scheduling information for the SIBs. The transmission of the MIB, SIB, and scheduling block is scheduled according to the timing of the PCCPCH. The MIB is always sent with a fixed offset related to the PCCPCH and with a fixed repetition period. Therefore, the UE is able to receive information via various channels when such information is needed to be received by the UE according to the fixed repetition period.

The system information which contains certain information, such as configuration of the cells and/or a GSM public land mobile network (PLMN) related information etc., is transported from the network to the UE. Some information is only valid in the cell where the SIB is transmitted, and some other information is valid in the entire network (i.e. PLMN). Therefore, depending upon the types of information, SIBs with information that is valid in the cell must be re-read each time the UE moves to another cell and SIBs with information that is valid in the entire network do not need to be re-read each time the UE moves to a different cell.

Generally, the SIBs can be linked to a timer if the system information changes frequently. These types of SIBs include a timer value such that once the UE has read the SIB, it knows the SIB needs to be re-read after the time indicated by the timer. These types of SIBs are only re-read by the UE when the timer expires. If the timer value is set to infinite, it means that the UE will never re-read those SIBs again after the UE has acquired those SIBs once.

Therefore, in the conventional art, if the timer is set to a finite value, the UE will not re-read SIBs before the timer has expired. This causes an unnecessary time delay for updating the system information. Also, if the timer is set to an infinite value, it is not possible to update the system information stored in the UE unless the UE moves to the new cell or PLMN.

For example, the UE needs to receive system information on the uplink interference in order to access the random access channel (RACH), and the UE uses persistence values during the RACH access. In these procedures, the system information is transmitted in the SIB 7 that is linked to a timer. Usually, this system information is subject to frequent changes, as such, it is necessary that the UE should read up-to-date system information frequently.

DISCLOSURE OF INVENTION

Technical Problem

However, to avoid having the UE to read system information too often, the UE can be set to read system information only when a RACH access is requested, even if the UE does not need to perform a RACH update. Also, if the SIB 7 is scheduled with a certain time schedule for the transmission of a RACH message, the UE has to wait for the next time schedule. This also creates an unwanted time delay.

Also, although the UE only needs to receive the SIB 7 once (i.e., at the time of cell entry), the stored system information of the UE can not be updated again when the timer is set to an infinite value. When the timer is set to an infinite value, the UE has to change the cell in order to update the system information.

Technical Solution

Therefore, the present invention provides an improved method of reading system information blocks (SIBs) by allowing the network (i.e., RNC) to trigger the UE to read or re-read the SIBs for applying new timer values and information values effectively.

To achieve this, if the system information needs to be changed or updated, the network may transmit an indication to the UE so that the UE may re-read all system information blocks (SIBs) that are related to a timer and/or a value tag.

BRIEF DESCRIPTION OF THE DRAWINGS

The invention will be described with reference to the drawings, in which:

FIG. 1 is a block diagram of a general UMTS network architecture.

FIG. 2 is a block diagram of a structure of a radio interface protocol between a terminal and a network based on 3GPP radio access network standards.

FIG. 3 illustrates the possible mapping between logical channels and transport channel from the UE perspective.

FIG. 4 illustrates the possible mapping between logical channels and transport channel from the UTRAN perspective.

FIG. 5 shows an exemplary diagram for the related art procedure of updating SIBs linked to a value tag.

FIG. 6 shows an exemplary diagram for updating of the SIBs linked to a value tag according to an exemplary embodiment of the present invention.

FIG. 7 shows an exemplary diagram for updating values of the SIB 7 by switching the SIB 7 timer between finite and infinite according to an exemplary embodiment of the present invention.

MODE FOR THE INVENTION

One aspect of the present invention relates to the recognition by the present inventors about the problems of the related art as described above, and further explained hereafter. Based upon this recognition, the features of the present invention have been developed.

Although the present invention is shown to be implemented in a mobile communication system, such as a UMTS developed under 3GPP specifications, the present invention can also be applied to other communication systems operating in conformity with different standards and specifications.

The present invention provides an improved method of reading system information blocks (SIBs) by allowing the RNC to trigger the UE to read or re-read the SIBs [i.e., SIB 7]. Namely, the UE may read or re-read the SIBs linked to a timer value and/or a value tag, upon reception of an indication from the RNC.

Before each access to the RACH, the UE may need to read some up-to-date information regarding the interference and radio resource situation in a cell which is transmitted in the SIBs linked to a timer. This information may be adapted regularly, and the information may be only valid for a given time. Therefore, the duration for the validity may be given in order to update this information when it is broadcasted. Thus, the UE may consider the validity of the given time that is associated with timer when the UE reads the information. The UE will re-read the information after the validity of the given time expires.

However, if the validity according to the timer is set to infinity, it is impossible to initiate the UE to read this information again. Therefore, the present invention may include system information update procedure using SIBs linked to a timer including possibly SIBs linked to value tags.

Here, the validity of system information, which read by the UE, may be controlled in different ways. The system information blocks (SIBs) may be linked to a value tag and/or a timer. In the case that the system information block is linked to a value tag which identifies the version of the information (i.e., system information) in the SIB, such value tag may be transmitted via the MIB. Thus, the UE may check whether SIBs from a given cell correspond to the version (i.e., value tag) of the SIB (i.e., the SIB has eventually stored for a given cell or PLMN) by just comparing the value tag of the stored block and the transmitted value tags in the MIB.

The Node B or RNC may generate a content of the SIBs. When the content of the SIBs is generated in the Node B, the RNC may indicate the scheduling information, and optionally the Node B may update a message [i.e., empty message] with the value that is also generated in the Node B. The RNC may generate the messages including the scheduling information and then may send this information to the Node B when the RNC generates the scheduling information. The Node B may store the messages and may instantly transmit them with the scheduled time via an appropriate channel.

In order to ensure that the UE has the most updated system information, the UE may need to read the MIB of a selected cell each time. When the UE moves to a new cell, the UE may need to check whether the SIBs of this new cell or network are valid based on the value tags. In order to allow the network to change the SIBs, the network may trigger the reading of the MIB by transmitting specific paging information to the UEs. As such, the UE may be triggered to read or re-read the MIB, and the UE may also compare the value tags of the SIB specified in the MIB with the stored SIBs of the UE.

FIG. 5 shows the related art diagram for updating SIBs linked to a value tag.

As illustrated in FIG. 5, the RNC may decide that the SIBs need to be changed or updated. (S1) The RNC may transmit the new and updated SIBs, MIBs and scheduling blocks to the Node B in order to provide the correct information to the Node B. (S2) Also, a paging message (i.e., paging type 1) may be transmitted to the UE in order to indicate that the system information with value tags needs to be updated. (S3) Here, the paging message which is transmitted on the PCCH channel may indicate that the SIBs linked to value tags have been updated. Therefore, the UE may read the MIB to check whether the SIBs need to be re-read. In addition, a certain indication may be transmitted first on the PICH channel before transmitting the paging message in order to inform the UE that a paging message will be transmitted. By doing this, the UE may reduce its reading time by only reading the PCCH after the certain indication is transmitted on the PICH channel. Once the UE receives the paging message, the UE may receive a changed or updated MIB. (S4) Then, the UE may compare the value tags in the changed or updated MIB in order to check whether the SIBs need to be reacquired. (S5) After this step, the UE may receive changed or updated SIBs that are linked to value tags. (S6)

FIG. 6 shows an exemplary diagram for updating of the SIBs linked to a timer value according to an exemplary embodiment of the present invention.

As illustrated in FIG. 6, the RNC may decide to change the SIB and/or the timer value related to the SIB. (S1) The RNC may decide that the update of the SIB needs to be indicated to all UEs such that the UEs are required to re-read the timer value. If necessary, the RNC may update the contents of the MIB and/or SIB (which includes the timer that is eventually updated) and/or the scheduling block. (S2) By using various types of messages [i.e., new messages, extended existing messages, etc.], the RNC may indicate to the UE that the SIBs linked to a timer need to be re-read or the timer value for the SIB linked to that timer needs to be re-read. So, the UE may re-read the SIBs linked to a timer when the UE receives such messages. For example, the UE may re-read the SIBs when a paging type 1 message transmitted on the PCH or PCCH is received and/or a paging type 2 message transmitted on the FACH. Here, the paging type 1 or type 2 messages may include a certain indication that the SIBs linked to a value tag need to be re-read. Also, the value tag may include an indication that the UE is required to re-read the SIBs linked to a timer. Further, the RNC may transmit a different message to indicate to the UEs that the UEs need to re-read the timer values and the other contents of the SIBs linked to a timer. It is possible that the paging type 1 messages may be transmitted to the UEs on the PCCH indicating that the UEs need to re-read all SIBs linked to a timer value, and all UEs may be ready to receive the paging message by setting all paging indications to 1. In addition, the RNC may transmit paging type 2 messages to indicate that the UEs need to re-read all SIBs linked to a timer value on the FACH to all UEs in Cell_FACH state. By receiving the paging type 1 or paging type 2 messages, the UE may re-read the MIB and/or SIBs linked to a timer value. Once the UE receives a changed MIB (S4), the UE may compare the value tags therein to the value tags of the SIBs stored in the memory (S5), and the UE may read or re-read the SIBs linked to timer values. Then, the UE may receive updated SIBs linked to the value tags. (S6)

FIG. 7 shows an exemplary diagram for updating values of the SIB 7 by switching the SIB 7 timer between finite and infinite settings (values) according to an exemplary embodiment of the present invention.

As illustrated in FIG. 7, the UE may listen to system information and may wait to receive the SIB (i.e., SIB 7) when the UE enters the cell. The Node B may periodically transmit the SIB to the UE including uplink interference, persistence values and a timer value. (S2) The timer value of the SIB may indicate for which time the SIB is valid. Here, this timer value may be set to a finite value or to an infinite value. The UE may receive the SIB, store the system information, and use the related timer value in order to check how long the received system information is valid before it needs to be re-read. (S3) As such, regarding to the information contained in the SIB, the UE may know whether the UE can use the stored information or whether such information needs to be re-read. The RNC may decide that the system information in the SIB or the related timer value needs to be updated. (S4) Then, optionally, the RNC may indicate to the Node B about the new system information and/or the related timer value. (S5) The RNC may indicate to the UE to re-read the system information by transmitting messages on the PCH or the FACH. (S6) As described above, various types of messages may be used to indicate that the system information should be re-read. It is also possible to trigger that all UEs read paging messages by setting their respective paging indicator on the PICH to 1. Since the Node B has been updated with the new/updated system information values and the new timer value, the Node B may broadcast the new SIBs linked to a timer value and the new timer values periodically according to the scheduling information as shown in step 7. The UE may receive the new SIB, and then apply the new values and/or the related timer. (S8) After these procedures, the UEs that have no valid SIBs being stored, may be provided with valid SIBs with infinite timer values. Alternatively, the UEs that have SIBs with infinite timer values being stored, may be provided with the valid SIBs with timer validity information.

It can be said that the present invention provides a method of transmitting system information included in system information blocks (SIBs), the method comprising: determining whether the system information is needed to be changed; and transmitting one or more messages to a UE via at least one transport channel, wherein the one or more messages indicate to the UE to read at least one SIB linked to a timer value; the system information is changed if the timer value related to the at least one SIB is changed; the one or more messages are new messages and/or extended existing messages; the one or more messages indicate to the UE to read the at least one SIB linked to the timer value and a value tag; the one or more messages indicate to the UE to read other contents of the at least one SIB linked to the timer value; the at least one transport channel is a paging channel (PCH) or a forward access channel (FACH); first type of messages are transmitted to the UEs via the PCH and/or second type of messages are transmitted to the UEs via the FACH; the first type of messages are ready to be triggered by the UE if all paging indicators on the PICH are set to 1; a validity of the timer value is checked by using of a related timer value; the timer value is transmitted periodically to the UE; and the timer value is finite or infinite.

The present invention also may provide a method of receiving system information included in system information blocks (SIBs), the method comprising: receiving one or more messages from a network via at least one transport channel; and reading at least one SIB linked to a timer value when the one or more messages are received; the system information is changed if the timer value related to the at least one SIB is changed; the one or more messages are new messages and/or extended existing messages; the one or more messages indicate to the UE to read the at least one SIB linked to the timer value and a value tag; the one or more messages indicate to read other contents of the at least one SIB linked to the timer value; the at least one transport channel is a paging channel (PCH) or a forward access channel (FACH); first type of messages are received via the PCH and/or second type of messages are received via the FACH; the first type of messages are triggered if all paging indicator on the PICH are set to 1; a validity of the timer value is checked by using of a related timer value; the timer value is periodically received; and the timer value is finite or infinite.

Although the present invention is described in the context of mobile communications, the present invention may also be used in any wireless communication systems using mobile devices, such as PDAs and laptop computers equipped with wireless communication capabilities (i.e. interface). Moreover, the use of certain terms to describe the present invention is not intended to limit the scope of the present invention to a certain type of wireless communication system. The present invention is also applicable to other wireless communication systems using different air interfaces and/or physical layers, for example, TDMA, CDMA, FDMA, WCDMA, OFDM, EV-DO, Wi-Max, Wi-Bro, GSM, GPRS, EDGE, EGPRS, LTE, etc.

The exemplary embodiments may be implemented as a method, apparatus or article of manufacture using standard programming and/or engineering techniques to produce software, firmware, hardware, or any combination thereof. The term "article of manufacture" as used herein refers to code or logic implemented in hardware logic (e.g., an integrated circuit chip, Field Programmable Gate Array (FPGA), Application Specific Integrated Circuit (ASIC), etc.) or a computer readable medium (e.g., magnetic storage medium (e.g., hard disk drives, floppy disks, tape, etc.), optical storage (CD-ROMs, optical disks, etc.), volatile and non-volatile memory devices (e.g., EEPROMs, ROMs, PROMs, RAMs, DRAMs, SRAMs, firmware, programmable logic, etc.).

Code in the computer readable medium may be accessed and executed by a processor. The code in which exemplary embodiments are implemented may further be accessible through a transmission media or from a file server over a network. In such cases, the article of manufacture in which the code is implemented may comprise a transmission media, such as a network transmission line, wireless transmission media, signals propagating through space, radio waves, infrared signals, etc. Of course, those skilled in the art will recognize that many modifications may be made to this configuration without departing from the scope of the present invention, and that the article of manufacture may comprise any information bearing medium known in the art.

As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims, and therefore all changes and modifications that fall within the metes and bounds of the claims, or equivalents of such metes and bounds are therefore intended to be embraced by the appended claims.

The invention claimed is:

1. A method of transmitting system information included in system information blocks (SIBs), the method comprising:
   determining whether the system information is to be changed;
   transmitting a message of a first type to a user equipment (UE) via a paging channel (PCH); and
   transmitting a message of a second type to the UE via a forward access channel (FACH),
   wherein the message of the first type or the message of the second type includes an indication indicating whether the SIBs linked to a value tag are to be read, and
   wherein the value tag includes an indication indicating whether the SIBs linked to a timer are to be read, to facilitate an application of the system information of the SIBs linked to the timer.

2. The method of claim 1, wherein the system information is changed if a value of a timer linked to at least one of the SIBs is changed.

3. The method of claim 1, wherein the message of the first type and the message of the second type comprise at least new messages or extended existing messages.

4. The method of claim 1, wherein the message of the first type or the message of the second type further includes an indication indicating whether the timer is to be read.

5. The method of claim 1, further comprising setting paging indicators on a paging indicator channel (PICH) to 1.

6. The method of claim 1, wherein a validity of the timer is checked by using a value of a related timer.

7. The method of claim 1, further comprising periodically transmitting a value of the timer to the UE.

8. The method of claim 1, wherein a value of the timer is finite or infinite.

9. A method of receiving system information included in system information blocks (SIBs), the method comprising:
   receiving a message of a first type via a paging channel (PCH);
   receiving a message of a second type via a forward access channel (FACH), the received message of the first type or the received message of the second type including an indication indicating whether the SIBs linked to a value tag are to be read, the value tag including an indication indicating whether the SIBs linked to a timer are to be read; and
   reading the SIBs based on the received message of the first type and the received message of the second type, in order to apply the system information of the read SIBs.

10. The method of claim 9, wherein the message of the first type and the message of the second type are received if a value of a timer linked to at least one of the SIBs is changed.

11. The method of claim 9, wherein the received message of the first type and the received message of the second type comprise at least new messages or extended existing messages.

12. The method of claim 9, wherein the message of the first type or the message of the second type further includes an indication indicating whether the timer is to be read.

13. The method of claim 9, further comprising reading the message of the first type if paging indicators on a paging indicator channel (PICH) are set to 1.

14. The method of claim 9, further comprising checking a validity of the timer by using a value of a related timer.

15. The method of claim 14, further comprising periodically receiving a value of the timer.

16. The method of claim 15, wherein the value of the timer is finite or infinite.

17. The method of claim 16, further comprising periodically receiving at least an update of the value tag, an updated value of the timer, or an updated value of the related timer.

18. The method of claim 17, wherein periodically receiving at least the update of the value tag, the updated value of the timer, or the updated value of the related timer comprises receiving another timer having a finite or infinite value.

* * * * *